Sept. 3, 1935. R. A. WILKINS 2,013,326
STORAGE CONTAINER FOR BEER
Filed March 31, 1934
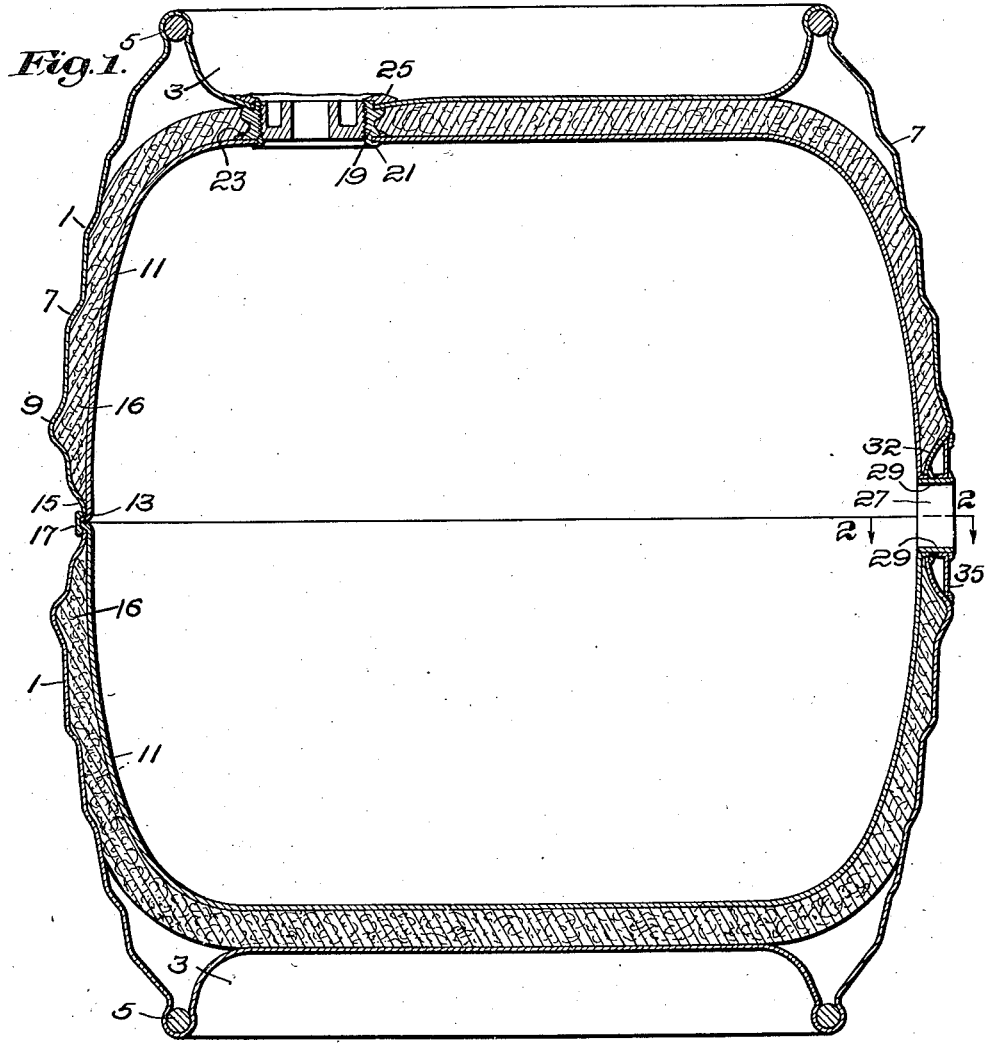
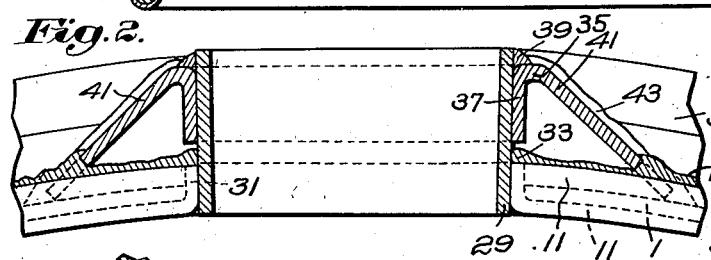
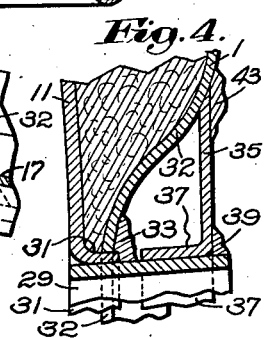
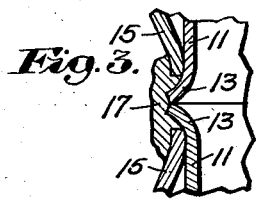
Inventor:
Richard A. Wilkins
by Emery Booth
Attys.

Patented Sept. 3, 1935

2,013,326

UNITED STATES PATENT OFFICE 2,013,326

STORAGE CONTAINER FOR BEER

Richard A. Wilkins, Rome, N. Y., assignor to Revere Copper and Brass Incorporated, Rome, N. Y., a corporation of Maryland Application March 31, 1934, Serial No. 718,479

5 Claims. (Cl. 220—9)

My invention relates to storage containers for malt beverages such as beer, and particularly, but not exclusively, to metal beer barrels.

Metal beer barrels as heretofore constructed commonly consist of an outer shell and an inner lining, the shell and lining being held in spaced relation, with a body of insulating material between them. Commonly both the shell and the lining are of steel.

As is well known to those skilled in the art, steel, in common with most other metals otherwise commercially usable for fabricating beer barrels, when in contact with beer and the like has a deleterious effect on the taste and color of the beer. These metals impart to the beer a metallic taste or an undesired taste characteristic of the presence of metal, and also cause discoloration of the beer. Tin plate, for example, or an alloy with a high tin content, commonly gives the beer a discoloration commonly termed "tin haze".

Many metals, particularly steel, are subject to serious corrosion when in contact with the beer. This not only shortens the life of the container, but seriously affects the color and flavor of the beer. Iron rust, for example, is highly objectionable in these respects.

For the above reasons it has heretofore been found impractical to store beer in a barrel or other container with the beer in contact with the metal surface. The attempt to do this, even where no serious corrosion occurs, has resulted in the beer losing its "brightness" accompanied by a deleterious effect on the taste of the beer, causing an inferior or unmarketable product.

In an attempt to avoid corrosion, discoloration of the beer, and a deleterious effect on the flavor of the beer, when metal beer barrels are employed, it has been common practice for the brewer upon receiving the barrels from the barrel manufacturer to coat the insides of the barrels with socalled "brewer's pitch".

The brewer's pitch is commonly applied by placing it in the barrel in a liquid state and spinning the barrel for the purpose of coating the interior surfaces. This expedient has proved to a large extent unsatisfactory in practice. In the first place, the process commonly leaves exposed areas due to the fact that every spot on the interior surface is not covered by the pitch, and in the second place, the alternate expansion and contraction of the metal, due to temperature change, and rough handling of the barrel, cracks and flakes the pitch lining, further exposing the metal. This results in the beer coming in contact with the metal, causing the latter to corrode and the flavor of the beer to be adversely affected. This cracking and flaking of the pitch lining as applied to metal beer barrels is so serious that it is common practice for the brewer to re-pitch the beer barrels, as heretofore constructed, prior to each time they are filled with beer by the brewer. With steel barrels the corrosion is so great that commonly barrels have to be discarded after several months' use.

Applicant has found that copper-silicon-tin alloys having approximately from 0.25 to 3% tin, and 0.25 to 4% silicon, with a high copper content, do not affect the brightness of the beer or impart thereto a metallic taste. Further these alloys are highly corrosion resistant to beer, tests showing a remarkably small copper content imparted to the beer when in contact with the metal, this copper content, for example, being much less than that of mothers' milk. By properly proportioning the silicon to the copper, the alloys may be rendered hot and cold workable, enabling them to be rolled into sheets preliminary to forming the barrel. Further the sheets are of high strength, enabling ready fabrication of the barrel and the barrel to be made of minimum weight, and imparting thereto extreme durability.

When the tin content is much over 1% ordinarily best results will be secured with silicon contents not exceeding 1%, although slightly higher silicon contents are not precluded. Very satisfactory alloys can be obtained for the purpose when the tin range is between 0.25 and 1.5% and the silicon range is between 2 and 4%.

The copper in these cases may constitute the balance of the alloy or, if desired, small amounts of other metals may be incorporated. For example, and particularly in the alloys having 0.25 to 1.5% tin and 2 to 4% silicon, zinc may be incorporated. Ordinarily the copper should not be less than 85% or, if zinc is employed, not more than about 96%. The zinc ordinarily should not be less than about 1%.

The alloys having between 2 and 4% silicon and 0.25 and 1.5% tin, with or without zinc, are highly desirable from the aspect that they may be heat treated or annealed to render them exceedingly ductile enabling the barrel or lining to be easily spun or otherwise shaped by cold working. This cold working increases the hardness and tensile strength to a high degree, and further heat treatment of the cold worked lining below the annealing temperature relieves cold working stresses and increases the yield point without decreasing the hardness of the alloy.

Ordinarily the alloys may be annealed by heating them to 1000 to 1200° F. and maintaining them at that temperature until further heating will not further decrease their tensile strength. The cold worked barrel or lining may be heat treated by heating it to about 500 to 600° F. for 30 to 90 minutes and slowly cooling it by exposing it to the air.

The present invention therefore comprehends a storage container as, for example, a beer barrel, made of the above mentioned alloy or lined with the same, so as to present a container having an inner surface formed of said alloy. When so constructed, if the common practice of pitching is followed, failure entirely to coat the inner surface of the container, and cracking and flaking of the pitch coating, have no effect on the color and flavor of the beer. In fact, applicant's experience indicates that the brewer may, if he desires, omit pitching the container. Further, due to the fact the beer does not corrode the alloy, the container so constructed has an indefinitely long life.

The invention is not limited to use in any particular construction of storage container or barrel. However, for convenience in describing the invention, one form of barrel embodying the invention is illustrated in the accompanying drawing, in which, Fig. 1 is a longitudinal section of a beer barrel the lining of which consists of the improved metal;

Fig. 2 is a section on the line 2—2 of Fig. 1 on an enlarged scale; and

Figs. 3 and 4 are respectively more or less diagrammatic illustrations on an enlarged scale showing details of assembly.

The barrel illustrated in the drawing has an outer shell, preferably of sheet metal, and an inner shell or lining formed of the hereinbefore mentioned copper-silicon alloy.

As shown, the outer shell is formed of two cup-shaped halves 1 shaped to present chines 3, the metal at the edges of the chines being bent over circular reinforcing rods 5, and the lateral walls of the shell being corrugated as indicated at 7 and 9 for imparting stiffness thereto. Similarly, the inner shell or lining is made of two cup-shaped sheet metal halves 11, preferably formed by pressing them from a flat sheet of the alloy.

As illustrated, the cup-shaped halves 11 of the lining are bent outward at their rims to form flanges 13, while the outer shells 1 are formed with reduced diameter portions 15 having edges which abut with the inner shells adjacent the flanges. After the four halves thus formed are placed in assembled relation with the insulating bodies 16 between them, they may be welded together at their rims to form an integral construction by use of an electric arc and a welding rod, the latter preferably of the same metal as the lining. It will be understood that the welding operation applies a mass 17 of weld around these rims, but that the drawing shows the weld joint diagrammatically, and that in practice the adjacent edges of the outer shell and lining are fused with each other and the weld metal into a more or less homogeneous mass.

An opening in the upper head of the barrel, as viewed in the drawing, may be provided by forming the corresponding head portions of the inner and outer shells with aligned perforations, and securing in these perforations a screw threaded sleeve 19, which latter is preferably a casting of the same metal as the inner shell. These perforations conveniently are formed before the barrel is assembled. The sleeve 19 is preferably initially formed, at its inner end, with a flange of reduced diameter which is inserted in the perforation in the inner shell and, as shown in the drawing at 21, is then bent downward, by a peening operation, to lie against the inner surface of the inner shell about the edges of this perforation so as to secure the sleeve to the shell, after which, and before the inner and outer shells are secured together, the sleeve is welded to the inner shell as indicated at 23. When the shells are assembled the outer end of the sleeve is received by the perforation in the top head of the outer shell, and is welded thereto as indicated at 25.

The opening 27 in the lateral wall of the barrel may be provided by forming the inner and outer shell halves 1 and 11 with complementary, semi-circular recesses which, when the shell halves are assembled, form circular openings for receiving a tapered sleeve 29 preferably formed of the same material as the inner shell. As shown, the inner shell or lining is so formed about the circular opening therein as to provide an outwardly extending circular flange 31, which flange is received in the aligned circular opening formed in the cup-shaped dished-in portion 32 of the outer shell. After the cup-shaped halves of the two shells are assembled, as hereinbefore described, the sleeve 29 may be inserted in the opening of the flange 31 and the parts integrally united, as indicated at 33, by use of a welding rod and arc. For reinforcing the sleeve 29 an insert 35 may be provided having a circular opening formed by an inturned flange 37, which insert may be placed over the sleeve and welded thereto as indicated at 39. As shown by Figs. 2 and 4, the insert 35 has a portion extending radially of the sleeve 29, and inclined portions 31, so that the insert may contact with the outer shell substantially entirely about its edges. These edges, as shown, are welded to the outer shell as indicated at 43.

I claim:

1. A storage container for beer and the like having the inner surface thereof formed of a high copper content copper-silicon-tin alloy having sufficient silicon and tin to make it corrosion resistant, the tin being between approximately 0.25 and 3%, the silicon being in amount between 0.25 and 4% and proportioned relative to the tin to keep the alloy workable while increasing its strength, the balance of the alloy containing 85% or more of copper.

2. A storage container for beer and the like having the inner surface thereof formed as a lining of a high copper content copper-silicon-tin alloy having sufficient silicon and tin to make it corrosion resistant, the tin being between approximately 0.25 and 3%, the silicon being in amount between 0.25 and 4% and proportioned relative to the tin to keep the alloy workable while increasing its strength, the balance of the alloy containing 85% or more of copper.

3. A storage container for beer and the like having the inner surface thereof formed of a high copper content copper-silicon-tin alloy having sufficient silicon and tin to make it corrosion resistant, the tin being between approximately 1 and 3%, the silicon being in amount between 0.25 and 4% and proportioned relative to the tin to keep the alloy workable while increasing its strength, the balance of the alloy containing 85% or more of copper.

4. A storage container for beer and the like having the inner surface thereof formed of a high copper content copper-silicon-tin alloy having sufficient silicon and tin to make it corrosion resistant, the tin being between approximately 0.25 and 1.5%, the silicon being in amount between 2 and 4% and proportioned relative to the tin to keep the alloy workable while increasing its strength, the balance of the alloy containing 85% or more of copper.

5. A storage container for beer and the like having the inner surface thereof formed of a high copper content copper-silicon-tin alloy having sufficient silicon and tin to make it corrosion resistant, the tin being between approximately 0.25 and 1%, the silicon being in amount between 2 and 4%, the balance of the alloy containing approximately 85 to 96% copper and a small amount of zinc for increasing the workability of the alloy.

RICHARD A. WILKINS.